Oct. 31, 1944.   J. D. LATHROP   2,361,637
GRASS RECEPTACLE
Filed Oct. 23, 1943   2 Sheets-Sheet 1
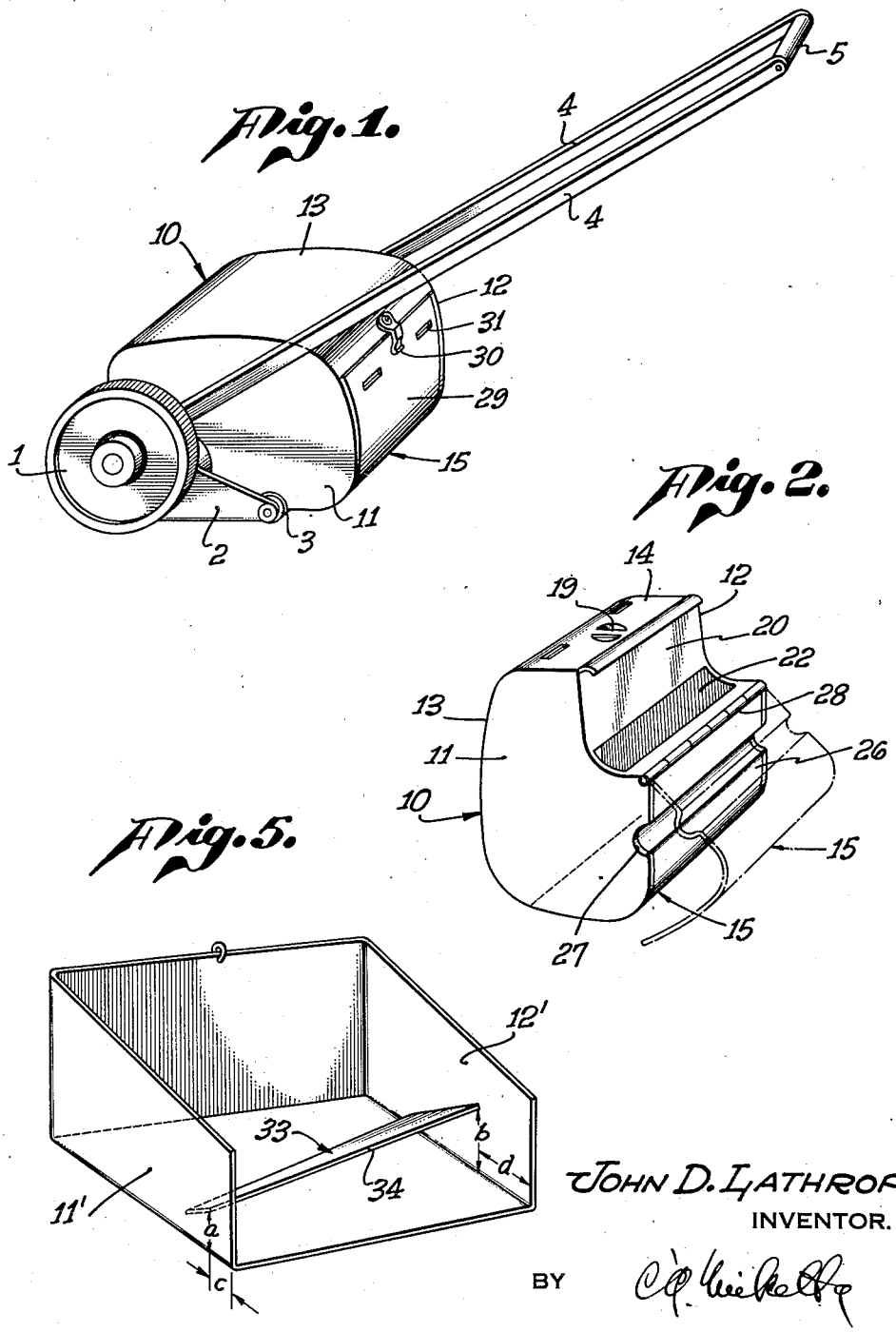

Oct. 31, 1944.  J. D. LATHROP  2,361,637
GRASS RECEPTACLE
Filed Oct. 23, 1943   2 Sheets-Sheet 2

JOHN D. LATHROP,
INVENTOR.

BY
ATTORNEY.

Patented Oct. 31, 1944

2,361,637

UNITED STATES PATENT OFFICE 2,361,637

GRASS RECEPTACLE

John D. Lathrop, Los Angeles, Calif.

Application October 23, 1943, Serial No. 507,398

9 Claims. (Cl. 56—199)

This invention pertains to improvements in grass mowers and is particularly directed to a grass catcher or receptacle for cut grass. Although the invention is specifically directed to grass mowers and receptacles for use therewith, certain aspects of the invention may be adapted for use with other type of mowing equipment and wherever cut, relatively short pieces of vegetable matter are being discharged from a cutting mechanism into a receptacle or box.

The ordinary grass mower is generally provided with a scoop-like receptacle supposed to receive the cut grass. These receptacles are ordinarily attached to the handle and to upstanding wings carried by the pressure roller at the rear of the lawnmower. These scoop-like receptacles are highly unsatisfactory. In the event a wind is blowing at the time that the grass is being cut, the cuttings, being upwardly discharged by the spinning or rotating cutter blades, are carried off with the breeze and instead of being deposited in the receptacle are redeposited upon the grass. Moreover, when it is necessary or desirable to suddenly stop the forward progress of the mower or cutter, the cuttings in the receptacle invariably slide forward out of the receptacle and into the throat of the mower and onto the ground. A further disadvantage of ordinary grass receptacles is that the cuttings are thrown upwardly, rearwardly and to one side. The sideways motion is the result of the spiral arrangement of the cutting blades. As a result, one side of the receptacle is ordinarily overfilled while the other side has very few cuttings.

The present invention in its preferred embodiment contemplates an entirely enclosed receptacle for grass cuttings so arranged that the cuttings are not distributed by the wind and will not spill in the event the forward motion of the mower is suddenly stopped. The improved grass catcher is much more readily attached and removed from the mower, thereby permitting the cuttings to be readily transported to a suitable place of disposal. The invention also pertains to the use of a distribution vane within a grass catcher, the distribution vane assuring an equal distribution of cuttings in the receptacle, thereby increasing the capacity of the receptacle.

An object of the present invention, therefore, is to disclose and provide an improved type of receptacle for use on mowers and the like.

A further object of the invention is to disclose and provide an enclosed, light weight receptacle for cuttings, whereby the cuttings may be properly retained in the receptacle and discharged from the receptacle when desired.

A still further object of the invention is to disclose and provide means for equalizing the distribution of grass cuttings in a grass catcher.

These and other objects, advantages, uses and adaptations of the invention will become apparent to those skilled in the art from the following detailed description of certain forms which the invention may assume. Exemplary forms of the invention are illustrated in the appended drawings, in which:

Fig. 1 is a perspective view of a lawnmower provided with the improved cutting receptacle of the present invention.

Fig. 2 is a perspective view of the receptacle in a position which it assumes when being carried, dotted lines indicating the position of the parts when the contents of the receptacle are being discharged.

Fig. 5 is a perspective of a grass-catching receptacle provided with a distribution vane embraced by this invention.

Figure 3:
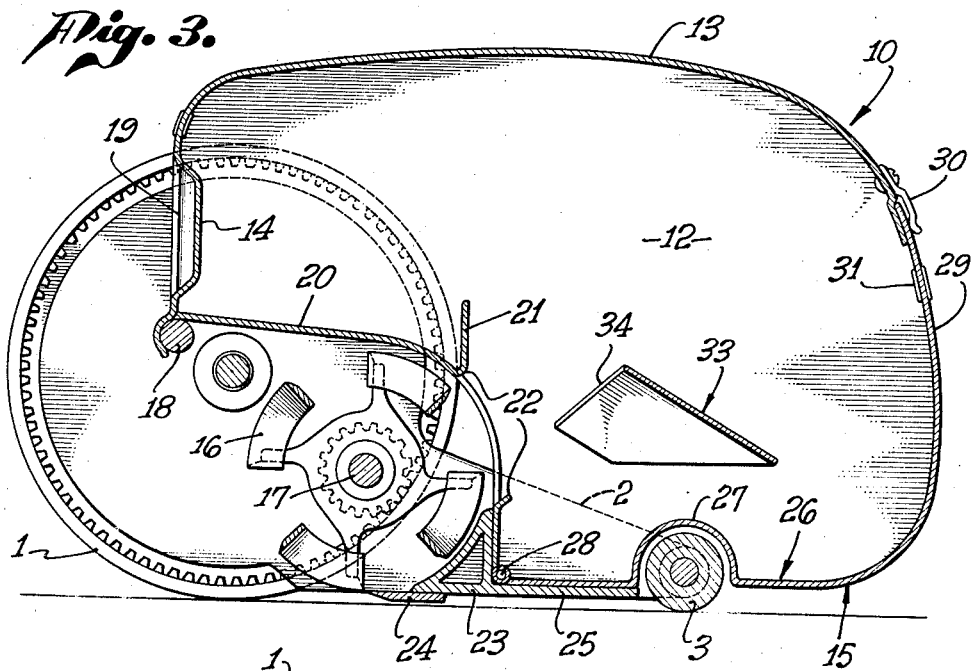
Fig. 3 is a transverse section taken through a lawnmower provided with the improved grass catcher.
Figure 4:
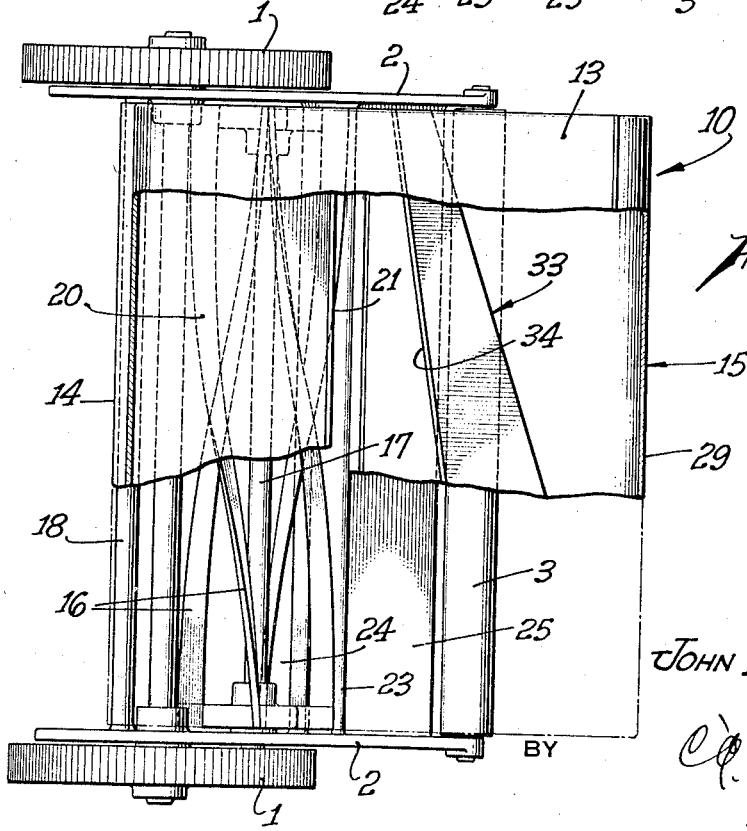
Fig. 4 is a plan view of a lawnmower and the grass catcher, portions of the cutting receptacle being broken away.

The embodiment of the invention is shown as carried by a lawnmower having the driving and supporting wheels 1, a rearwardly extending bracket 2 carrying the roller 3 and a pair of handles 4 connected as at 5, whereby the mower may be pushed. Obviously the invention is not limited to its use on a lawnmower of the precise construction shown since it may be made a part of any manually operated or motor driven mower.

The grass catcher of the invention is generally indicated by the numeral 10 and consists essentially of side members 11 and 12, a top 13 and a bottom portion 15.

By referring to Fig. 3, it will be noted that the side 12 is provided with a forwardly extending portion which extends above the cutting blades 16, such cutting blades being carried by spiders mounted upon the shaft 17 which carries a pinion gear in engagement with the internal gear associated with the driving wheel 1. The forwardly extending portions of the side elements 11 and 12 are adapted to rest upon the connecting or frame bar 18. The rear portions of the side elements 11 and 12 extend downwardly to a point adjacent the roller 3. The side elements 11 and 12 may have semi-circular areas cut therefrom so as to straddle the roller 3. The top 13 connects the side elements 11 and 12. The top 13 may be provided with a downwardly extending front portion 14 which may have a handle 19 pressed therefrom. A partition 20 may connect the side elements 11 and 12 immediately above the cutting blades 16, thereby forming a shelf upon which cuttings may collect. The partition or shelf 20 may be provided with an upstanding lip 21 immediately above the throat or opening generally indicated at 22, through which cuttings are discharged into the receptacle.

The brackets 2 which extend rearwardly from the mower may be provided with a rigid element 23 carrying a cutter bar 24. Cutting of grass or the like is accomplished by the cooperation of the rotating cutting blades 16 against the edge of the cutting bar 24. The cutting bar 24 may be removably attachable to the connecting element 23. The connecting element 23 may be provided with a rearwardly extending lip 25 and the grass receptacle 10 may rest thereon. The bottom of the grass receptacle 10 may include a member 26 provided with an indentation or bead 27 to accommodate the roller 3. The bottom 26 may be hinged to the side members 11 and 12 at a point adjacent the throat 22 as, for example, at 28. The rear portion of the bottom 26 may curve upwardly as indicated at 29 and be removably attachable to the rear portion of the top 13, as for example, by means of a latching member 30. Ports or openings 31 may be formed in the rear section 29 of the bottom member.

The grass receptacle described hereinabove is also provided with a distribution vane, generally indicated at 33, which extends from one side to the other of the grass catcher at the level of the throat opening 22. The forward edge 34 of the distribution vane 33 is higher and farther from the cutting blades at one side of the catcher than at the other side thereof. The position and arrangement of the distribution vane 33 is most clearly shown in Fig. 5, this figure showing an ordinary grass cutting receptacle provided with such vane. It will be noted that the vane 33 extends between the sides 11' and 12' of the receptacle and the front edge 34 of the vane is inclined upwardly and rearwardly from the side 11' to the side 12'. The distance $c$ represents the distance from the front of the grass catcher to the front edge 34 of the vane and it will be noticed that this distance is smaller than the distance $d$ which indicates the distance from the front of the grass catcher to the front edge 34 at the side element 12'. The height of the front edge above the floor of the receptacle is illustrated by the distances $a$ and $b$ and it will be noted that the distance $b$ is greater than the distance $a$.

The distribution vane 33 preferably lies in a plane inclined downwardly and rearwardly and moreover the width of such distribution vane may vary. Preferably the vane is wider on the high side and narrower at the low side, as shown in the drawings.

Grass cuttings are thrown into the receptacle through the throat 22 to a point above the distribution vane 33. Ordinarily such cuttings accumulate in greater quantities against the side 12'. The distribution vane, because of its inclination and disposition, causes the cuttings to distribute themselves more evenly over the bottom of the receptacle, thereby increasing the capacity of the receptacle. It is also to be noted that in the event the forward motion of the mower is suddenly terminated, the cuttings in the receptacle will not shift forwardly through the throat 22 but instead will be retained in the bottom of the receptacle by reason of the bead or indentation 27 and the forward lip of the bottom 26. Some cuttings may also find themselves on the shelf 20.

The ports or openings 31 permit the operator to observe the extent to which the receptacle has been filled. After it has been filled, the receptacle is readily removed from the mower by grasping the handle 19. The entire receptacle may be carried in the position indicated in Fig. 2 to a point where the cuttings may be disposed of. At such point, the latch 30 is disengaged and the entire bottom member 26 may be swung outwardly along the hinge 28, permitting the entire contents of the receptacle to be dumped.

The receptacle 10 illustrated in Figs. 1, 2, 3 and 4 may be made of sheet metal, plastic, plywood or any other suitable material. It is to be remembered, however, that the distribution vane 33 may also be employed in the ordinary receptacles made of canvas or the like, illustrated in Fig. 5. The vane 33 may be stitched or clamped onto, or otherwise attached to the sides 11' and 12' of the receptacle.

All changes and modifications coming within the scope of the appended claims are embraced thereby.

I claim:

1. A cuttings receptacle to be carried by a mowing device, comprising: a pair of substantially parallel side members having overhanging front portions; a top connecting the side members, said top extending downwardly in front; a shelf member connecting the bottom edges of the overhanging portions of said side members; a bottom member hingedly connected to the side members and extending rearwardly and upwardly into substantial contact with the rear of the top; and means for releasably connecting the rear of said bottom member with the rear portion of the top.

2. In combination with a grass mower including spirally arranged cutting blades: a grass catcher comprising a pair of substantially vertical side members having front portions extending above the cutting blades and rear portions extending downwardly and rearwardly, a shelf member connecting the side members above the cutting blades, a top connecting the upper edge portions of said side members and extending downwardly in front, and a bottom member hingedly connected to said side members and extending upwardly in the rear into substantial contact with the rear portion of the top, the forward edge of said bottom member being spaced from said shelf to form a throat adapted to receive cuttings from the cutting blades.

3. In combination with a grass mower including spirally arranged cutting blades: a grass catcher comprising a pair of substantially vertical side members having front portions extending above the cutting blades and rear portions extending downwardly and rearwardly, a shelf member connecting the side members above the cutting blades, said shelf member being provided with an upstanding lip, a top connecting the upper edge portions of said side members and extending downwardly in front, a bottom member hingedly connected to said side members and extending upwardly in the rear into substantial contact with the rear portion of the top, the forward edge of said bottom member being spaced from said shelf to form a throat adapted to receive cuttings from the cutting blades, and a distribution vane positioned above said hinged bottom and attached to the side members, said distribution vance being inclined to the handle in two directions.

4. In a device of the character described in claim 1, a distribution vane connected to the side members and positioned above the bottom, said vane lying in a plane inclined rearwardly and downwardly from its forward edge, said vane being at a lower level at one side than at the other.

5. A cuttings receptacle to be carried by a mowing device including spirally arranged cutting blades, comprising: a pair of substantially parallel side members having overhanging front portions, said front portions being adapted to extend above cutting blades of a mowing device, front and top portions connecting the side members and adapted to maintain the latter in substantially parallel relation, a shelf member connecting the lower edges of the overhanging front portions of said side members, a bottom member hingedly connected to the side members and extending rearwardly and upwardly into substantial contact with the rear of the top, a transversely extending throat port between said shelf and said bottom member, and means for releasably connecting the rear of said bottom member with the rear portion of the top.

6. In a device of the character defined in claim 5, a distribution vane connected to the side members and in close proximity to said throat port, said distribution vane being attached to one of said side members at a higher level than the level of attachment to the other side member.

7. In a device of the character defined in claim 5, a distribution vane connected to the side members and in close proximity to said throat port, said distribution vane being attached to one of said side members at a higher level than the level of attachment to the other side member, the front edge of said vane being closer to said port at the low side of the vane than at the high side, said vane lying in a plane inclined downwardly and rearwardly from such front edge.

8. In a grass catcher adapted to be removably attached to a mowing device and including a bottom and side portions, the provision of: a distribution vane carried by the grass catcher and extending from side to side thereof, said distribution vane lying in a plane inclined rearwardly and downwardly from the front edge thereof and also inclined from one side to the other.

9. In a device of the character defined in claim 5, the provision of: a handle carried by the front of said device, and a distribution vane within said device and adjacent the throat port, said distribution vane being inclined rearwardly and downwardly and from one side to the other.

JOHN D. LATHROP.